(12) United States Patent
Huntley

(10) Patent No.: US 7,769,781 B1
(45) Date of Patent: Aug. 3, 2010

(54) METHOD FOR LABELING DATA STORED IN SEQUENTIAL DATA STRUCTURES WITH PARAMETERS WHICH DESCRIBE POSITION IN A HIERARCHY

(76) Inventor: Stephen Edward Huntley, 3804 W. Wrightwood Ave., Chicago, IL (US) 60647

( * ) Notice: Subject to any disclaimer, the term of this patent is extended or adjusted under 35 U.S.C. 154(b) by 343 days.

(21) Appl. No.: 11/752,303

(22) Filed: May 23, 2007

(51) Int. Cl.
*G06F 7/00* (2006.01)
*G06F 7/32* (2006.01)

(52) U.S. Cl. .................. 707/791; 707/736; 708/620

(58) Field of Classification Search ............. 707/102, 707/673, 736, 752, 791, 802; 708/7, 503, 708/620, 622, 623, 624, 625, 626; 709/201, 709/205
See application file for complete search history.

(56) References Cited

U.S. PATENT DOCUMENTS

| | | | |
|---|---|---|---|
| 5,343,554 A * | 8/1994 | Koza et al. ................. | 706/13 |
| 5,467,471 A | 11/1995 | Bader | |
| 6,480,857 B1 | 11/2002 | Chandler | |
| 6,625,615 B2 | 9/2003 | Shi | |
| 2005/0154681 A1 * | 7/2005 | Schmelzer ................. | 705/67 |
| 2007/0040710 A1 * | 2/2007 | Tomic ...................... | 341/50 |

OTHER PUBLICATIONS

Celko, Joe. Joe Celko's Trees and Hierarchies in SQL for Smarties. 2004. Morgan-Kaufmann. San Francisco, CA, USA.
Tropashko, Vadim. "Nested intervals tree encoding in SQL." ACM SIGMOD Record. Jun. 2005. pp. 47-52. vol. 34, Issue 2. ACM Press. New York, NY, USA.

\* cited by examiner

*Primary Examiner*—Tony Mahmoudi
*Assistant Examiner*—MD. I Uddin

(57) ABSTRACT

A method for calculating numerical values in a manner which can be interpreted as encoding places in a hierarchy, and are in a format convenient for storage and retrieval on computer systems. The numerical values are calculated by associating paths in a hierarchy with sub-sequences of terms of a mathematical series where an ordering of the sub-sequences according to the occurrence of the first terms of the sub-sequences in the mathematical series is the same as an ordering of the magnitude of the sums of the terms of the sub-sequences. Said numerical values can be conveniently stored as integer or floating-point data types commonly used in computer systems and as such assigned to appropriate data elements in a data structure which defines serial relationships between the items it stores. Thus this invention enables sequential data structures such as arrays, linked lists and databases to store and retrieve tree structure data efficiently.

8 Claims, 4 Drawing Sheets

| Node | Level | Summation Value | Term Value | Sum |
|---|---|---|---|---|
| a | 0 | 1 | 1 | 1 |
| b | 1 | 2 | 0.125 | 1.125 |
| c | 1 | 3 | 0.037 | 1.037 |
| d | 2 | 3 | 0.037 | 1.162 |
| e | 2 | 4 | 0.015 | 1.140 |
| f | 2 | 4 | 0.015 | 1.052 |
| g | 2 | 5 | 0.008 | 1.045 |

Figure 2

| Node | Level | Summation Value | Term Value | Sum |
|---|---|---|---|---|
| a | 0 | 1 | 0 | 0 |
| b | 1 | 2 | 0.5 | 0.5 |
| c | 1 | 3 | 0.375 | 0.375 |
| d | 2 | 3 | 0.141 | 0.641 |
| e | 2 | 4 | 0.091 | 0.591 |
| f | 2 | 4 | 0.091 | 0.466 |
| g | 2 | 5 | 0.063 | 0.438 |

Figure 3

| Node | Sum | Virtual Sibling |
|---|---|---|
| b | 0.5 | 1 |
| c | 0.375 | 0.5 |
| d | 0.641 | 0.75 |
| e | 0.591 | 0.641 |
| f | 0.466 | 0.516 |
| g | 0.438 | 0.466 |

Figure 4

METHOD FOR LABELING DATA STORED IN SEQUENTIAL DATA STRUCTURES WITH PARAMETERS WHICH DESCRIBE POSITION IN A HIERARCHY

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates generally to data processing systems, and specifically to techniques for storing and retrieving data elements with reference to their place in a hierarchical structure.

2. Prior Art

In the field of computer systems engineering, a great deal of attention and effort is given to the definition and development of so-called "abstract data structures." When dealing with a problem which requires manipulation of data, computer engineers typically take great care to select an abstract data structure most appropriate for the data to be handled, such that expenditure of computer resources is minimized in the execution of programs written to manage the given problem.

A number of classic abstract data structures have been defined which have proven useful and efficient when applied to a broad range of computing problems. Among these is the tree structure, which is useful for organizing information that is naturally expressible as a hierarchy of data nodes; in a tree structure, each individual data node is identified as having a place in a hierarchy such that at most one other node is known as its "parent" occupying a superior position in the hierarchy, and an unrestricted number of other nodes are identified as its "children," each of which is placed at an inferior position.

Distinct from the tree structure are data structures generally known as arrays, lists and linked lists. These structures organize data elements serially, so that one element is understood to be placed in a position "before" or "after" another in a defined sequence. The sequential nature of such structures may be exploited for fast searching and sorting, and when placed on a persistent storage device may be composed formally as a database, or a set of databases known as a relational database management system. Databases and relational database systems have proved very successful in providing fast and efficient access to sequentially structured data.

A great deal of research has been done in the field of computer engineering in pursuit of combining the descriptive utility of the tree data structure with the speed and efficiency of the search and manipulation algorithms associated with arrays, lists and database systems. Solutions found in the prior art have only been partially effective, and attempts to improve on traditional methods typically simply swap one form of inefficiency for another.

The simplest solution in the prior art is to incorporate hierarchical information into a sequential data structure by assigning a unique ID to each node in the sequential structure, then including in or associating with the node an identifiable value corresponding to the unique ID of the node's parent node. This is known in the art as the "adjacency list" approach. The advantages of this approach are the simplicity of the concept and of the algorithms for searching and manipulating nodes as they relate to the hierarchical structure. The chief disadvantage is that the algorithms typically used to search, sort and manipulate data elements within the structure require recursive loops in the logic, which are slow and resource-intensive. That is, in order for example to find all the descendants of a particular node (children, children's children, etc.), code must be executed to search the structure for the node's children, then the same code executed again for each child found to find its children, and so on—the same code repeatedly executed as many times as necessary until all the desired nodes are found. Often, impractical amounts of time are required to complete such recursive algorithms.

Another approach in the prior art, which attempts to eliminate recursive algorithms, associates with each node a record of all the node's ancestors (parent, parent's parent, etc.). These records are known in the art as "materialized lists" or "materialized paths." This approach eliminates necessity for recursion in most useful algorithms: for example, to find all of a given node's descendants, one simply does a single search of all materialized paths to find those that contain the given node's unique ID. The chief disadvantage of this approach is that, even if the node ID's themselves are pure numbers, when included in a materialized path they must be delimited so the place where one ends and another begins can be detected; this is typically done by putting a non-numerical character between each ID, which means on the most commonly used computer systems the path itself must be stored as a string data type rather than a numerical data type. Operations on string data types are much slower that those on numerical data types; so that although recursion is eliminated, search and manipulation algorithms can still take an unacceptably long time to complete.

U.S. Pat. No. 6,480,857 (Chandler) describes a method of delimiting integer node ID's in a materialized path by storing each ID in a separate column in a relational database table. String character delimiters are thus eliminated and fast integer functions can be used to compose necessary algorithms. But this method makes inefficient use of memory allocated as storage space—every row in the table must contain a cell corresponding to each possible level's column, even though the great majority of cells will often be empty. This great excess multiplicity of cells wastes memory and will tend to slow down queries as they are parsed.

U.S. Pat. No. 6,625,615 (Shi et al.) and U.S. Pat. No. 5,467,471 (Bader) each make use of the concept known in the art as "hierarchical genealogical tables." This approach replaces the need for a large number of columns in a relational database table with the necessity for a large number of rows in a table separate from the original node data. This separate genealogical table requires a row entry for each ancestor relationship of each node in a hierarchy. That is, for example if a given node has four ancestors, four rows must be created for it in the genealogical table, each one linking the ID of the given node to the ID of one of its ancestors. This approach eliminates arbitrary limits on hierarchy depth and necessity for string type functions in algorithms. But this approach requires the size of the genealogical table to grow geometrically in proportion to the number of nodes added. The large number of rows which accrue in the table of all but small hierarchies will result in large memory storage requirements and slow execution of database queries. The need for a second table separate from the main node data table means increased complexity of the system, and keeping the hierarchical information of the two tables in sync is an error-prone task. In addition, it is considered desirable among database engineers to minimize the number of write actions to a table necessary to complete a given task, because write actions are generally the slowest and most resource-intensive. Creating a new node with this approach typically requires multiple write actions to the genealogical table, and the inefficiency of node creation grows as the tree increases in size.

Celko introduced the "nested sets" approach to modeling a hierarchy in a relational database. In this approach each node is assigned two parameters, a low-value integer and a high-value integer. The child of a given node is assigned integers as parameters such that their values fall between the low value and the high value of the given node's parameters. Thus all the descendants of a given node may be found by searching for all nodes whose low-value integer is greater than the given node's and whose high-value integer is less than the given node's. This approach uses integer data types and does not require excessive rows or columns, and thus searches are fast. The chief disadvantage of this approach is that if a new node is added, the gaps between the high and low value integers of some nodes may have to be widened to make room for it, and depending on how the tree is structured the parameters for a large number of existing nodes may have to be recalculated, and all the new parameter values must be written to the database table. The large number of write actions required for a typical edit of the hierarchy makes add and delete algorithms extremely slow. Thus the nested sets approach is only considered practical if the hierarchy structure is expected to change only rarely.

Tropashko introduced the concept of "nested intervals" as a means of overcoming the shortcomings of the nested sets approach. This approach makes use of rational numbers instead of integers as high and low value parameters. Since it is always theoretically possible to find, between the values of two rational numbers, two more rational numbers, it is in theory possible to add a node to a hierarchy described by nested intervals without recalculating or rewriting parameters, thus eliminating the chief drawback of the nested sets approach.

The chief challenge of Tropashko's approach is designing an algorithm which efficiently calculates the intervals between the high and low values to be associated with each node, since they must become progressively smaller as nodes are added to the tree, and the limited precision of numeric data types found on the most commonly used computer systems puts a strict bound on how small a stored value can be. Tropashko offers a number of algorithms for calculating the interval, all of which result in exponential decreases in interval size as nodes are added. Thus only a relatively small number of nodes can be described before the precision limits of the computer system are reached. For example, using the most efficient algorithm ("continued fractions") to store a tree in which each node has ten children, a numeric data type of 32-bit precision could only hold parameters corresponding to six levels' worth of nodes before its capacity ran out.

An alternative algorithm offered by Tropashko, ("Farey fractions") is less efficient in terms of controlling shrinkage of interval size, but it stores the numerator and denominator of the rational numbers calculated rather than the numbers themselves; this allows more nodes to be stored within given precision limits, but consequently requires extensive calculations to reconstitute and compare the intervals as retrieval queries are processed—this slows query execution time. Also, since the stored numerators and denominators only express the node intervals indirectly, the index functions available with the most commonly used database systems can't be meaningfully used, thus full table scans are typically necessary to execute searches, another contributor to slow query execution. This alternative also requires that iterative algorithms be executed when calculating the parameters for new nodes, these algorithms run more slowly as the hierarchy grows in size; thus the time required to add nodes may become unacceptable for large trees.

SUMMARY

This invention is a method for calculating sequences of numerical values in a manner which can be interpreted as encoding places in a hierarchy and are in a format convenient for storage and retrieval on computer systems. These numerical values are calculated by associating paths in a hierarchy with sub-sequences of terms of a mathematical series where an ordering of the sub-sequences according to the occurrence of the first terms of the sub-sequences in the mathematical series is the same as an ordering of the magnitude of the sums of the terms of the sub-sequences. Said numerical values can be conveniently stored as integer or floating-point data types commonly used in computer systems and as such assigned to appropriate data elements in a data structure which defines serial relationships between the items it stores. Thus this invention enables serial data structures such as arrays, linked lists and databases to store and retrieve tree structure data efficiently.

DRAWINGS

Figures

FIG. 2 is a table whose values describe a tree data structure by means of parameters calculated in accordance with this invention.

FIG. 3 is a table whose values describe a tree data structure by means of parameters calculated in accordance with a preferred embodiment of this invention.

FIG. 4 is a table listing search parameters for the nodes in a tree data structure optimized for a structured database search.

DETAILED DESCRIPTION

FIGS. 1 and 2

Figure 1:
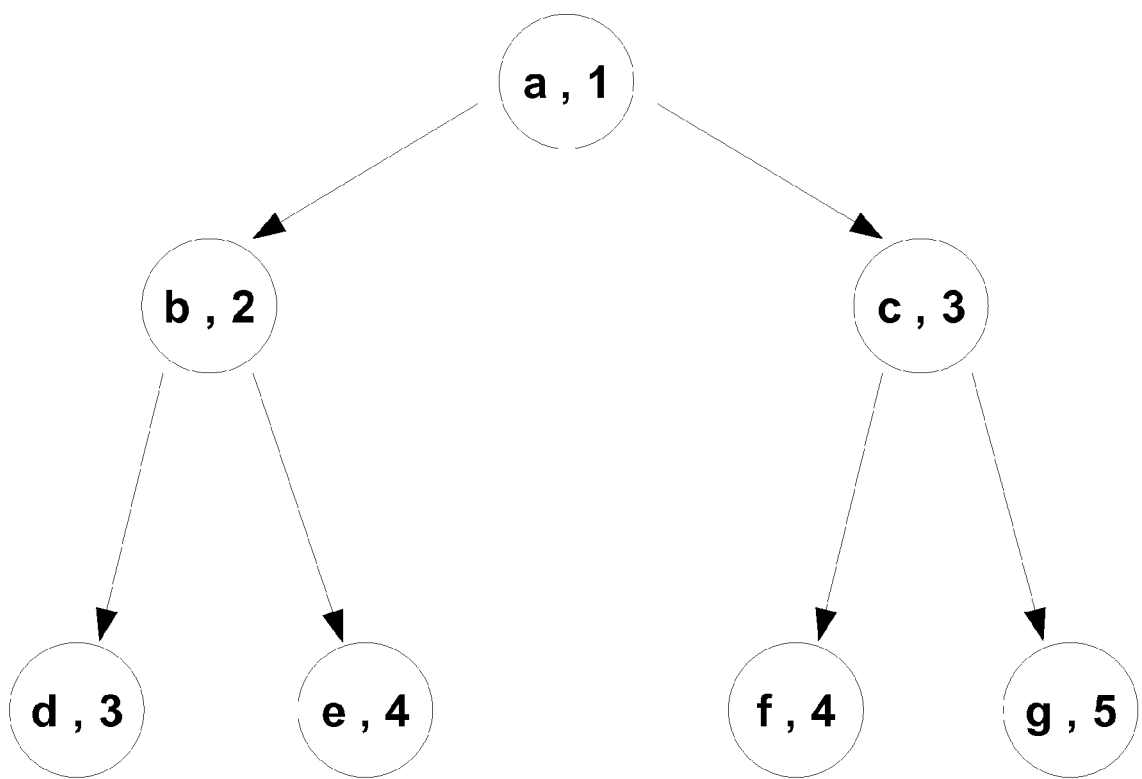
FIG. 1 is an illustration of a tree data structure.

Equation 1 is a mathematical series suitable for use in one embodiment of this invention:

$$\sum_{n=1}^{5} 1/n^3 = 1/1^3 + 1/2^3 + 1/3^3 + 1/4^3 + 1/5^3 \qquad \text{Eq. 1}$$

Terminology: in the above equation, the symbols above and below the Greek letter sigma define a sequence of summation values and a summation index variable: n is the summation index variable, 1 is the lower bound of summation values, 5 is the upper bound of summation values; hence the sequence defined is the numbers 1 through 5. To the right of the sigma is a function of the summation index variable; the function defines a sequence of terms to be added, which are shown to the right of the equal sign, each term being the output of the function whose input is one of the summation values.

The series shown in Equation 1 is suitable for use in an embodiment of this invention because it has the following qualifying property:

any set of sub-sequences of terms of the series, sorted into an order according to the occurrence in the series of the first term of each sub-sequence, can be sorted into the same order according to the magnitude of the sum of the terms of each sub-sequence.

To illustrate, consider three sub-sequences of the sequence of terms of Eq. 1:

$$1/1^3=1 \qquad \text{sub-sequence 1}$$

$$1/2^3+1/3^3=0.162 \qquad \text{sub-sequence 2}$$

$$1/3^3+1/4^3+1/5^3=0.06 \qquad \text{sub-sequence 3}$$

The three sub-sequences are sorted according to occurrence in the series defined in Eq. 1 of the first term of each sub-sequence; that is, the first term of sub-sequence 2 ($1/2^3$) comes after the first term of sub-sequence 1 ($1/1^3$) in the sequence of terms shown in Eq. 1, and before the first term of sub-sequence 3 ($1/3^3$).

At the same time, the sub-sequences are also sorted by magnitude of the sum of the terms of each sub-sequence (in this case, by decreasing order of magnitude). That is, the sum of the terms of sub-sequence 1 (1) is greater than the sum of the terms of sub-sequence 2 (0.162), which is in turn greater than the sum of the terms of sub-sequence 3 (0.06).

Both methods of sorting (by first term and by magnitude of sum) result in the same sort order. The same will be true of any set of sub-sequences of the terms defined by Eq. 1. Thus Eq. 1 has the qualifying property necessary for use in the method of this invention.

FIG. 1 is a simple diagram of the concept behind a tree data structure. Data elements are defined as nodes in a hierarchy. Each node in the diagram is assigned a letter as a unique label. Node "a" at the top of the hierarchy is the "root" node. All the other nodes are defined as having one "parent" existing one level higher in the hierarchy, and may have zero or more "children" existing one level lower. The nodes at levels above a given node with a defined intermediary parent-child connection to the given node are the node's "ancestors," and all nodes which have a given node included among their ancestors are the given node's "descendants." Nodes which share a parent are "siblings."

A relationship of parent to child in FIG. 1 is illustrated with an arrow pointing from the parent node to the child node. A succession of arrows pointing from node to node defines a "path." Thus a path exists, for example, between node "a" and node "g", but no path exists between node "c" and node "d". If a path exists between two nodes, the nodes are defined as mutually "reachable."

This invention is a method for calculating a numerical value for each node in a tree data structure which encodes the reachability of the node with respect to every other node in the hierarchy, by mapping each path from root to child in the hierarchy to a unique sub-sequence of terms of a mathematical series which has the qualifying property defined above, and associating with each node the sum of the sub-sequence of terms identifying the path which ends at the node.

An embodiment of this invention may be illustrated by mapping each path starting from the root node in the tree structure of FIG. 1 to a unique sub-sequence of the terms define in Eq. 1.

To accomplish this mapping, each node in the tree data structure diagram shown in FIG. 1 is assigned one of the summation value numbers defined by Eq. 1 subject to the following constraints: 1.) each node's number comes after the number of its parent in the sequence, and 2.) each node's number is unique with respect to its siblings. The tree structure diagram of FIG. 1 shows summation value numbers assigned to each node consistent with these constraints, each number following the node's label letter after a comma.

Each path in the tree data structure is thus identified by a unique sub-sequence of the sequence of summation values defined in Eq. 1. The path from node "a" to node "g" is identified by the sub-sequence [1,3,5], and the path from node "a" to node "d" is identified by the sub-sequence [1,2,3].

FIG. 2 is an illustration of a sequential data structure storing node information in the form of a table. Each row represents a node, each node's label letter is in the column named "Node." Each node's assigned summation value is listed in the column named "Summation Value."

Since Eq. 1 defines a term, being the output of the function of the summation index variable, for each summation value, the numerical value of the term corresponding to the summation value for each node may be associated with the node. The table of FIG. 2 shows each node's corresponding term value in the column named "Term Value."

In accord with the method of this invention, a unique numerical value may now be calculated for each node in the table of FIG. 2 which encodes the node's reachability with respect to every other node. Each node is at the end of a unique path starting at the root node, and each unique path in the tree structure starting from the root is identified by a unique sub-sequence of the sequence of summation values defined in Eq. 1. Each summation value corresponds to a term with a numerical value defined in Eq. 1, so each node may be represented by the sum of the terms corresponding to the sub-sequence of summation values which uniquely identifies the node's path from the root.

Thus for example, since the path from node "a" to node "g" is identified by the sub-sequence [1,3,5], the value of the sum of the terms $1/1^3+1/3^3+1/5^3=1.045$ may be associated with node "g".

The table of FIG. 2 lists the values of the reachability-encoding sum so calculated for each node in the column named "Sum."

The reachability-encoding sums so calculated may be used to determine if any node is a descendant of any other node by means of a simple reachability decision rule:

a given node is a descendant of a candidate node if the candidate node's reachability-encoding sum is less than that of the given node, and no node on the same level as the candidate node has a reachability-encoding sum greater than the candidate node's and less than the given node's.

The above reachability decision rule works because of the nature of Eq. 1, its qualifying property guarantees that no sub-sequence of terms will add up to a value greater than any term which occurs in the series before the first term of the sub-sequence.

Thus, for example, node "g" may be definitely determined to be a descendant of node "c", because node "g"'s value in the "Sum" column (1.045) is greater than node "c"'s corresponding value (1.037), and the only node on the same level as node "c" with a value in the "Sum" column greater than node "c"'s is node "b" (1.125), but node "b"'s sum is greater than node "g"'s, so node "c" qualifies as an ancestor of node "g" according to the above rule.

Therefore it is clear that the hierarchical structure of the tree in FIG. 1 is perfectly expressed in the sequential data structure of FIG. 2 in a format that is easy to calculate, store and retrieve via simple algorithms.

It will be readily apparent to computer engineers of ordinary skill that the methods outlined in the above description can be easily adapted to use with virtually any sequential data structure in common use in the field, including those structures known as arrays, lists and databases, and the algorithms described can be expressed using virtually any mainstream programming language.

PREFERRED EMBODIMENT

FIGS. 3 and 4

In order to illustrate the advantages and improvements this invention offers versus existing prior art, a preferred embodiment of this invention, a variation of the above described method appropriate for a relational database system which makes use of the industry standard Structured Query Language (SQL) for storage and retrieval of data, will be described in detail. It should be noted from the outset that database design in the contemporary practice of the computer arts takes many forms: some database programs load all or nearly all of the data they manage into the computer's volatile random access memory (RAM) for speed, some keep all or nearly all of their data on a tangible computer-readable device such as a hard drive for persistence and storage of large data volumes. But regardless of the form of the data structure or database or the precise physical computer-readable medium on which it resides, virtually all general purpose computers in use today access and manipulate data in the same way namely by reading and writing strings of binary digits of predefined length, residing in memory addressable by the computer's processor, in a succession of processor operations, or cycles. The breadth of the ranges of memory addressable per processor operation, and the consequent maximum length of readable/writable strings of binary digits, is defined and circumscribed by the character of the physical construction of the computer and its data busses, and the physical layout of the transistorized integrated circuits of the computer's processor. From the viewpoint of the computer programmer the limit on the length of strings of binary digits that a computer can address in a discrete processor operation puts a strict limitation on the mathematical precision of the calculations that a program running on the computer can efficiently carry out. The preceding discussion has foregone mention of the limited available precision of computerized calculations of the specified equations for the sake of clarity of illustration. The preferred embodiment described below will emphasize one of the chief advantages of this invention over prior art, namely the ability of the below-specified equations to generate a large number (in some cases, an order of magnitude larger than methods in the prior art) of meaningful labels that can be descriptively applied to hierarchical nodes which, given the physical limitations of the length of strings of binary digits a computer can efficiently manipulate, can be expressed as numbers of a predetermined limited precision.

Eq. 1 is useful for encoding only very small hierarchies. This is a limitation arising from the equation's mathematical nature, rather than any traits of a computer running a program that may incorporate it. It is desirable in practice to be able to encode hierarchies which are very large or virtually unlimited in size. Attempts to store large hierarchies in a database via the most widely used methods of the prior art have resulted in slow execution of search queries. Thus, a preferred embodiment of this invention should make use of an equation whose inherent mathematical nature and input parameters are able to generate a theoretically unlimited number of node-encoding parameters, limited only by the function of the computer on which a program incorporating it runs.

Other methods of the prior art require expenditure of large amounts of computer memory in attempts to gain speed in query execution. A preferred embodiment of this invention should make highly efficient use of available memory by having the ability to calculate and store a large number of node parameters in the allotted limited-precision numeric data type formats commonly used by database systems.

In order to exceed the prior art by achieving both goals of speed and efficient memory use, a more suitable mathematical series will be used in the preferred embodiment. The new series introduces an additional summation index variable which will be mapped to the hierarchical level of the node being encoded. The function of two summation index variables defined in the new series is designed to make efficient use of available precision, and ensure that the terms of the series will conform to a qualifying property similar to that defined for Eq. 1, but over a much larger, potentially unlimited range of summation values.

$$\sum_{m=0}^{\infty} \sum_{n=2}^{\infty} \begin{cases} m=0 & 0 \\ m>=n & 0 \\ m<n & 1/2^{(\sqrt{(n-1)} * \sqrt{(3m-2)})} \end{cases} = \qquad \text{Eq. 2}$$

$$f(1,2) + f(1,3) + \ldots + f(2,3) + f(2,4) + \ldots$$

Terminology: Equation 2 is a double series. Two sequences of summation values are defined, represented by two summation index variables, m and n. A restricted domain of summation values with corresponding non-zero terms is defined for ease of illustration and translation into computer algorithms. Only terms where the value of m is less than the value of n will have positive values. The values of those terms is determined by a function of both summation index variables.

The qualifying property of Eq. 2 is slightly different than that of Eq. 1. Since the only relevant sub-sequences of Eq. 2 are those which will map to a path from root to child in a hierarchy, and since the level number of each node in a path will be greater than the level number of its parent, any subsequence of Eq. 2 where both summation values of each term are not greater than both summation values of the term preceding it is to be disregarded.

To illustrate this constraint, consider the two following sub-sequences of the sequence of terms defined in Eq. 2:

f(1,2)+f(1,3)+f(1,4)            sub-sequence 4 f(2,3)+f(3,4)+f(4,5)            sub-sequence 5

Sub-sequence 4 and sub-sequence 5 are sorted according to occurrence in the series defined in Eq. 2 of the first term of each sub-sequence. But in sub-sequence 4, the value of the summation variable m does not change, it remains 1 in each term. Thus sub-sequence 4 is not usable for this embodiment, and is disregarded. The value of m in sub-sequence 5, however, increments from 2 to 3 to 4 in each term, and the value of the summation variable n increments from 3 to 4 to 5 in each term. Thus sub-sequence 5 is suitable for consideration in evaluation of the qualifying property.

With that constraint made clear, Eq. 2 may be stated to have the following qualifying property:

any set of sub-sequences of terms of the series (in which each summation value increments in each term), sorted into an order according to the occurrence in the series of the first term of each sub-sequence, can be sorted into the same order according to the magnitude of the sum of the terms of each sub-sequence.

Eq. 2 may be used to calculate term values and reachability-encoding sums just as Eq. 1 was, if the additional step is taken of using each node's level number as the value of the summation index variable m. FIG. 3 is a table of values for the nodes in the trees structure of FIG. 1, with the values for the columns labeled "Term Value" and "Sum" calculated using Eq. 2 in this way.

For example, to calculate the term value of node "e", m is set to the value of node "e"'s level (2), and n is set to node "e"'s assigned value of summation index variable n (4). With these values for the summation index variables, the function $f(2,4) = \frac{1}{2}^{(\sqrt{(n-1)} \cdot \sqrt{(3m-2)})} = 0.091$ In order to make it possible to design SQL queries for the preferred embodiment that are simple and fast, an equivalent to the reachability decision rule stated previously which is much more practical for adaptation into computer algorithms can be developed by introducing the concept of a "virtual sibling." A node listed in FIG. 3 can be assumed to have a virtual sibling whose summation value is the node's summation value minus one. Whether or not this sibling actually exists is irrelevant for the purpose of evaluating the rule.

The reachability-encoding sums of the virtual siblings of the nodes listed in the table in FIG. 3 can be calculated via the following steps:

1.) subtract the number listed in the node's "Term Value" column from the value in the node's "Sum" column.

2.) set the summation index variable m to the value of the node's level number, and the variable n to the node's summation value minus one.

3.) input the variables m and n into the function of the summation index variables of Eq. 2

4.) add the output obtained in step 3 to the value obtained in step 1.

Thus to determine the sum of node "f"'s virtual sibling: subtract 0.091 from 0.466, 0.466−0.091=0.375; input m=2 and n=4−1=3 into the encoding function, $f(2,3) = \frac{1}{2}^{(\sqrt{(n-1)} \cdot \sqrt{(3m-2)})} = 0.141$; add 0.375+0.141=0.516; the virtual sibling's sum is 0.516.

FIG. 4 is a table showing the reachability-encoding sum (in the column named "Sum") and the virtual sibling's reachability-encoding sum (in the table named "Virtual Sibling") for nodes b through g (no calculation needs to be made for node "a"—as the root node all other nodes are known to be its descendants)

With the values of FIG. 4 so calculated, the reachability decision rule previously defined can now be simply restated as:

a given node is the descendant of a candidate node if the given node's reachability-encoding sum is greater than the candidate node's corresponding sum and less than the corresponding sum of the candidate node's virtual sibling.

The above rule can be expressed very easily as an efficient SQL query. For example, if the values in the table of FIG. 4 were imported into a database, all the descendants of node "b" could be retrieved by a standard SQL query of the following form:

SELECT Node WHERE Sum >0.5 AND Sum <1

The nodes whose value in the "Sum" column falls between the values shown are nodes "d" and "e", which are, as shown in FIG. 1, the descendants of node "b".

A similar SQL query will find all the ancestors of a given node. For example, to find all the ancestors of node "g" as described in FIG. 4, one needs to find nodes whose value in the "Sum" column is less than node "g"'s value in the "Sum" column, and whose value in the "Virtual Sibling" column is greater than node "g"'s value in the "Sum" column:

SELECT Node WHERE Sum <0.438 AND Virtual_Sibling >0.438

Node "c" is the only node listed in FIG. 4 which meets these criteria. FIG. 1 confirms that node "c" is node "g"'s ancestor.

Eq. 2 makes efficient use of limited-precision numeric data types used to store reachability-encoding sum parameters, and thus can store many more nodes than comparable prior art. This is because the exponent in the function of the summation index variables is a product of two square roots; thus when a new level in the hierarchy is created both summation index variables increment, and the term value of the child at the new level is smaller than that of its parent by a factor of an exponent of order 1. But when siblings are added at an existing level, only one variable increments, so the new node's term value is smaller than its siblings' only by a factor of an exponent of order ½. As an illustration of this efficiency, consider a tree in which each node has ten children: using Eq. 2, a numeric data type of 32-bit precision can hold parameters corresponding to seven levels' worth of nodes before its capacity runs out. Compared to the most efficient comparable prior art method (nested intervals with continued fractions), which can accommodate only six levels' worth of nodes, this amounts to storage capacity for over one million nodes (1,111,111), versus only about one hundred thousand nodes (111,111) for the prior art.

CONCLUSION, RAMIFICATIONS AND SCOPE

The preferred embodiment so described has a number of advantages, the full set of which is found in no existing prior art:

Retrievals of reachable nodes are fast, due to storage of hierarchy parameters as numeric data types, lack of need for recursion in retrieval algorithms, and no necessity for arithmetic calculations to be done at time of retrieval, only simple boolean comparisons.

It makes highly efficient use of memory storage space allocated to store hierarchy parameters: only a constant amount of storage space per node is required, none of the allocated space is unused, and a large number of node parameters can be stored within a given amount of numerical precision.

No hierarchy parameter ever has to be recalculated or rewritten regardless of how new nodes are added to the tree.

The steps required to create a new node or write a retrieval query are very simple and easy to program. The time required to calculate a new node's parameters stays substantially the same as the tree grows. Once the hierarchy parameters for a new node are calculated, only one write action is required to commit them to a database row.

No extra database tables are required to store hierarchy information separate from the non-hierarchy data associated with each node.

Hierarchy parameters can be meaningfully indexed using the indexing features common among relational database products, so full table scans are typically unnecessary for retrieval queries; thus, indexing can increase the speed of search queries considerably.

The examples, illustrations and embodiments described above are intended to facilitate understanding and disclosure of the invention, but should not be construed as limiting its scope. Computer engineers of ordinary skill will understand that implementation details will depend on the specific architecture of the computer data processing system used and the goals and priorities of the system design. For example:

Different mathematical series may be chosen, with functions of the summation variables selected as suitable for use depending on design priorities such as speed or efficient memory use, or other system-specific considerations.

Hierarchy parameters may be associated with other data elements in a node by any effective means; including storage in the same row in a database table, in separate tables linked by joins to a data table, via pointers, hash tables or any other convenient means.

Any suitable computer-based language or technique for communicating with and manipulating the sequential data structure may be used for designing storage and retrieval functions; namely, in the case where databases are employed, alternatives to SQL may be used.

Some hierarchy parameters may be calculated in full and stored when a node is created, or alternatively parameters may be only partially calculated and stored in advance, with final calculations executed dynamically as part of retrieval query processing.

In order to increase the capacity of a system employing this invention to store individual nodes, hierarchy parameters may be calculated to any arbitrary desired precision, then stored by a variety of means, including being broken up into single precision sub-ranges which are stored individually, or conversion into strings. Retrieval queries may be programmed to reconstitute and evaluate such transformed parameters as necessary without requiring multiple-precision calculations at time of retrieval, for example by catenating a sequence of boolean comparisons to compare each sub-range in turn.

Child nodes with no children of their own may use the sequence numbers and sum parameters of their parents if desired, in order to keep the child nodes from contributing to depletion of available precision of the numeric data types storing the hierarchy parameters. Such a child may be distinguished from its parent by examining the respective level values in appropriately designed retrieval queries. If it is later desired to assign children to such a childless node, a sequence number and hierarchy parameters of its own may be calculated and assigned to it without any need to edit any other node record.

This invention may be incorporated into a hybrid system that makes use of other means of storing and retrieving hierarchy information, including prior art techniques described above, for the sake of convenience, efficiency or enhanced storage capacity, or other reasons.

What is claimed is:

1. A method, implemented by loading a program into the addressable memory of a general purpose computer and executing said program, for representing a hierarchy in a sequential data structure, comprising the steps of:

selecting a mathematical series with a defined sequence of summation values and a defined sequence of terms, each said term being a function of an input variable, said input variable corresponding to the summation index variable of said defined sequence of summation values, said mathematical series having the property that any set of sub-sequences of said terms of said series, sorted into an order according to occurrence in said series of each sub-sequence's first term, can be sorted into the same order according to the magnitude of the result of adding each sub-sequence's terms, assigning to each node of said hierarchy one of said terms of said mathematical series, such that every parented node of said hierarchy has an assigned term which comes after said parented node's parent's assigned term in said mathematical series' said sequence of terms, and each said parented node of said hierarchy has an assigned term which is unique with respect to any of said parented node's siblings' assigned terms, calculating the respective numerical value of each respective node's assigned term and associating with each said respective node of said hierarchy said respective numerical value, calculating for each said respective node of said hierarchy the unique sum of said respective node's said respective associated numerical value plus the associated numerical values of all of said respective node's ancestors, splitting the range of binary digits which represent the value of said unique sum into segments such that the number of binary digits in each said segment is no longer than the maximum number of binary digits that said computer can address in a single data read/write cycle operating on said sequential data structure, defining in said sequential data structure a new data element by allocating in said computer's available memory a discrete number of addressable ranges equal to the number of said segments of said range of binary digits such that said addressable ranges of memory are capable of storing said range of binary digits in full, copying said segments of said range of binary digits each into one of said discrete number of addressable ranges of memory, whereby said general purpose computer becomes a special purpose computer whose addressable memory is in a state suitable for performing search and retrieval of hierarchical information.

2. The method of claim 1 where said sequential data structure is a database residing on a tangible computer-readable storage medium.

3. A method, implemented by loading a program into the addressable memo of a general purpose computer and executing said program, for representing a hierarchy in a sequential data structure, comprising the steps of:

selecting a double mathematical series with two defined sequences of summation values and a defined sequence of terms, each said term being a function of two input variables, said input variables corresponding to the summation index variables of said two defined sequences of summation values, said double mathematical series having the property that any set of sub-sequences of said terms, in which each summation value increments in each term, of said double series, sorted into an order according to occurrence in said series of each sub-sequence's first term, can be sorted into the same order according to the magnitude of the result of adding each sub-sequence's terms, assigning to each node of said hierarchy one of said terms of said double mathematical series, such that every parented node of said hierarchy has an assigned term which comes after said parented node's parent's assigned term in said double mathematical series' said sequence of terms, each respective said assigned term has one of its summation index variables set to a value equal to the level in said hierarchy of said parented node to which the respective said assigned term is assigned, and the numerical value of each said parented node's said assigned term is unique with respect to the numerical value of any of said parented node's siblings' assigned terms, calculating the respective numerical value of each respective node's assigned term and associating with each said respective node of said hierarchy said respective numerical value, calculating for each said respective node of said hierarchy the unique sum of said respective node's said respective associated numerical value plus the associated numerical values of all of said respective node's ancestors, splitting the range of binary digits which represent the value of said unique sum into segments such that the number of binary digits in each said segment is no longer than the maximum number of binary digits that said computer can address in a single data read/write cycle operating on said sequential data structure, defining in said sequential data structure a new data element by allocating in said computer's available memory a discrete number of addressable ranges equal to the number of said segments of said range of binary digits such that said addressable ranges of memory are capable of storing said range of binary digits in full, copying said segments of said range of binary digits each into one of said discrete number of addressable ranges of memory, whereby said general purpose computer becomes a special purpose computer whose addressable memory is in a state suitable for performing search and retrieval of hierarchical information.

4. The method of claim 3 where said sequential data structure is a database residing on a tangible computer-readable storage medium.

5. A non-transitory computer-readable storage medium with an executable program stored thereon, wherein the program instructs a computer processor to perform the following steps:

selecting a mathematical series with a defined sequence of summation values and a defined sequence of terms, each said term being a function of an input variable, said input variable corresponding to the summation index variable of said defined sequence of summation values, said mathematical series having the property that any set of sub-sequences of said terms of said series, sorted into an order according to occurrence in said series of each sub-sequence's first term, can be sorted into the same order according to the magnitude of the result of adding each sub-sequence's terms, assigning to each node of said hierarchy one of said terms of said mathematical series, such that every parented node of said hierarchy has an assigned term which comes after said parented node's parent's assigned term in said mathematical series' said sequence of terms, and each said parented node of said hierarchy has an assigned term which is unique with respect to any of said parented node's siblings' assigned terms, calculating the respective numerical value of each respective node's assigned term and associating with each said respective node of said hierarchy said respective numerical value, calculating for each said respective node of said hierarchy the unique sum of said respective node's said respective associated numerical value plus the associated numerical values of all of said respective node's ancestors, splitting the range of binary digits which represent the value of said unique sum into segments such that the number of binary digits in each said segment is no longer than the maximum number of binary digits that said computer can address in a single data read/write cycle operating on said sequential data structure, defining in said sequential data structure a new data element by allocating in said computer's available memory a discrete number of addressable ranges equal to the number of said segments of said range of binary digits such that said addressable ranges of memory are capable of storing said range of binary digits in full, copying said segments of said range of binary digits each into one of said discrete number of addressable ranges of memory.

6. The non-transitory computer-readable storage medium with an executable program stored thereon of claim 5 where said sequential data structure specified in said program is a database residing on a tangible computer-readable storage medium.

7. A non-transitory computer-readable storage medium with an executable program stored thereon, wherein the program instructs a computer processor to perform the following steps:

selecting a double mathematical series with two defined sequences of summation values and a defined sequence of terms, each said term being a function of two input variables, said input variables corresponding to the summation index variables of said two defined sequences of summation values, said double mathematical series having the property that any set of sub-sequences of said terms, in which each summation value increments in each term, of said double series, sorted into an order according to occurrence in said series of each sub-sequence's first term, can be sorted into the same order according to the magnitude of the result of adding each sub-sequence's terms, assigning to each node of said hierarchy one of said terms of said double mathematical series, such that every parented node of said hierarchy has an assigned term which comes after said parented node's parent's assigned term in said double mathematical series' said sequence of terms, each respective said assigned term has one of its summation index variables set to a value equal to the level in said hierarchy of said parented node to which the respective said assigned term is assigned, and the numerical value of each said parented node's said assigned term is unique with respect to the numerical value of any of said parented node's siblings' assigned terms, calculating the respective numerical value of each respective node's assigned term and associating with each said respective node of said hierarchy said respective numerical value, calculating for each said respective node of said hierarchy the unique sum of said respective node's said respective associated numerical value plus the associated numerical values of all of said respective node's ancestors, splitting the range of binary digits which represent the value of said unique sum into segments such that the number of binary digits in each said segment is no longer than the maximum number of binary digits that said computer can address in a single data read/write cycle operating on said sequential data structure, defining in said sequential data structure a new data element by allocating in said computer's available memory a discrete number of addressable ranges equal to the number of said segments of said range of binary digits such that said addressable ranges of memory are capable of storing said range of binary digits in full, copying said segments of said range of binary digits each into one of said discrete number of addressable ranges of memory.

8. The non-transitory computer-readable storage medium with an executable program stored thereon of claim 7 where said sequential data structure specified in said program is a database residing on a tangible computer-readable storage medium.

* * * * *